Feb. 28, 1939.  W. M. SCHOLL  2,148,650
METATARSAL GAUGE
Filed Jan. 9, 1936
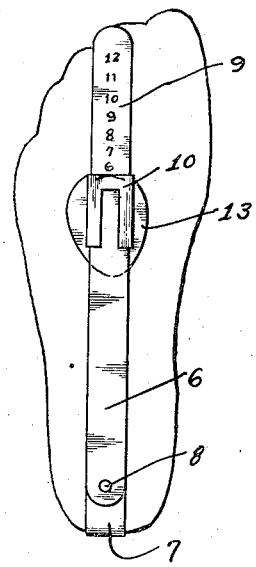
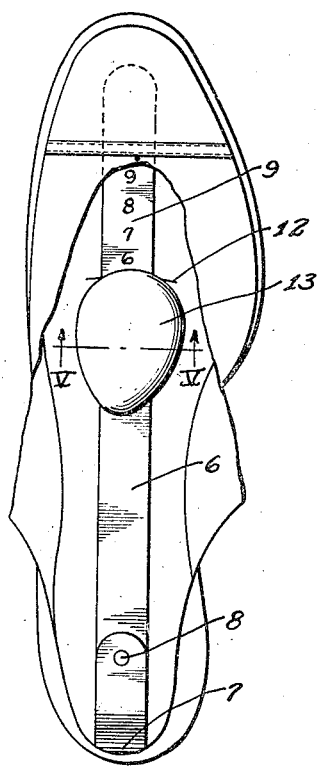
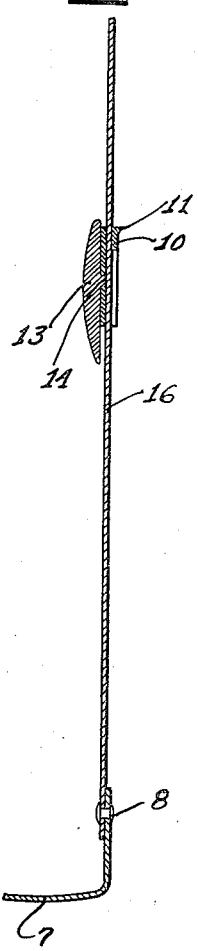
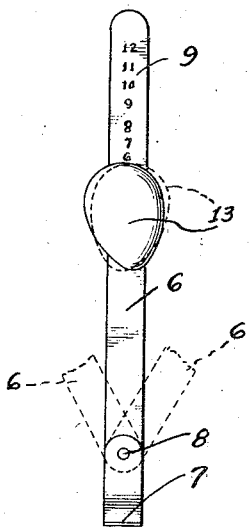
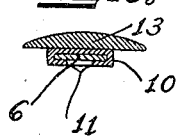
Inventor
William M. Scholl.

Patented Feb. 28, 1939

2,148,650

UNITED STATES PATENT OFFICE 2,148,650

METATARSAL GAUGE

William M. Scholl, Chicago, Ill.

Application January 9, 1936, Serial No. 58,292

8 Claims. (Cl. 33—3)

This invention relates to improvements in a metatarsal gauge highly desirable for use in measuring a foot and locating a spot in a shoe for disposition of a foot corrective appliance, such, for example, as a metatarsal pad, although the invention may have other uses and purposes as will be apparent to one skilled in the art.

Frequently, foot correction appliances, such as pads for supporting or strengthening the metatarsal arch of the foot, are secured in any suitable manner to the insole of a shoe. There are variances in each individual foot, and likewise variances in the location of the affliction and in the proper disposition of the corrective appliance for treating a particular affliction. Accordingly, it is desirable to have means for accurately ascertaining the precise location of the corrective appliance within a shoe. I am aware that heretofore gauges have been provided for indicating the location of the corrective appliance relative to a particular foot. However, these formerly known gauges were not sufficiently flexible, in every instance of which I am aware, so that the gauge could be used with a minimum of effort and sufficient rapidity, and so that the same gauge could be utilized with both left and right feet. In addition, it is desirable to have a gauge requiring no extraneous operations and requiring nothing else to be incorporated in order to properly mark the location of a corrective appliance in a shoe.

With the foregoing in mind, it is an object of the present invention to provide a metatarsal gauge applicable to a human foot to determine the proper setting, and then applicable to the insole of a shoe wherein the gauge itself with no other means may be utilized to properly mark the location for the subsequent positioning of the corrective appliance.

Another object of the invention is the provision of a gauge of the character described herein which is economical to manufacture, and which may be used with great facility and accuracy.

Still another object of the invention is the provision of a metatarsal gauge of such flexibility that the gauge may be adjusted for use with either a left or right foot without necessitating the separation of any of the parts of the gauge.

It is also a feature of this invention to provide a gauge of this character which will accurately take the proper measurement and accurately indicate in a shoe the location for the corrective appliance, with a simple manipulation of the gauge itself and without the use of any extraneous apparatus.

It is a further aim of the invention to provide a gauge of the character described wherein the adjustable indicating element carries thereupon the complete means for marking the insole of a shoe to designate the location for a corrective appliance to properly adjust a particular foot.

While some of the more salient features, characteristics and advantages of the present invention have been above pointed out, others will become apparent from the following disclosures taken in conjunction with the accompanying drawing, in which:

Figure 1 is a bottom plan view of a metatarsal gauge embodying principles of the present invention, showing the same in operative position on a human foot diagrammatically illustrated;

Figure 2 is a top plan view of the same gauge showing the same in position in a shoe and indicating how the location of the corrective appliance is marked in the shoe by the gauge;

Figure 3 is a top plan view of the gauge itself, indicating various manipulations or adjustments of the gauge in dotted lines;

Figure 4 is an enlarged central vertical sectional view through the gauge; and

Figure 5 is a transverse vertical sectional view through the gauge itself, taken substantially as indicated by the line V—V of Figure 2.

As shown on the drawing:

In the illustrated embodiment of the present invention, a device is shown for indicating the proper disposition of a foot corrective appliance in the form of a metatarsal pad for strengthening, reshaping or otherwise aiding the metatarsal region of the foot. This device includes a relatively flat measuring rod 6 having a curved upwardly extending heel-engaging part 7 pivoted to the rod as indicated at 8, the pivotal connection 8 being such that there is sufficient friction to maintain a relative position of the parts 6 and 7 in ordinary usage, without binding, so as to permit free relative adjustment of these parts.

The measuring rod 6 carries on each side of the forward portion thereof an indicating scale 9 with any suitable indicia. Slidable on the rod 6 is a sleeve 10 engaging the rod with sufficient friction to maintain a position of adjustment during ordinary usage, but insufficient to prevent the easy readjustment thereof. The forward end of the sleeve is provided with a depending prong 11 extending downwardly from the underside of the sleeve so as not to contact the foot while the initial measurement is being taken. This prong is relatively sharp so that it may be used to score the insole of a shoe, as indicated by the line 12 in Figure 2.

An indicating element 13 in substantially the form of a metatarsal pad or button is pivoted, as at 14 in Figure 4, to the upper portion of the sleeve 10, this pivotal connection also providing sufficient friction to maintain a position of adjustment in normal usage but insufficient to prevent ready readjustment.

The element 13 may be made of any suitable material, such as metal or rubber, while the remainder of the gauge is preferably made of metal, the rod 6 being sufficiently flexible to conform to the longitudinal arch of a foot when placed thereagainst, as indicated in Figure 1, so that a true and accurate indication may be given.

In operation, the present invention may be used with great facility, rapidity and accuracy. The particular location of the foot affliction is ascertained in the usual manner. Then it is simply necessary to take the gauge, place it against the sole of the foot as indicated in Figure 1, with the heel-engaging part 7 extending upwardly over the heel, and adjust the element 13 until it is seated in the proper position relative to the affliction. Scale readings may be obtained, if so desired, and the device is next inverted and laid in the shoe of the patient, as indicated in Figure 2. By holding the heel-engaging part 7 tightly in position, it is a simple expedient for the operator to press down upon the element 13 and the rod 16 and oscillate the forward portion of the rod on the aforesaid pivot 8 so that the prong 11 will score the insole of the shoe as indicated by the line 12, and thus mark the position for the forward edge of a metatarsal pad or other correction appliance to be attached inside the shoe.

Frequently, metatarsal pads are disposed in a shoe with the longitudinal axis of the pad at an angle to the longitudinal axis of the shoe. The element 13 is accordingly pivotally mounted, and it may be pivoted to one side or the other, as may fit the individual case. Such pivoting from one side to the other, as indicated by the dotted lines in Figure 3, also renders the same gauge effective for use in connection with both right and left feet. Accordingly, the flexibility of the gauge permits almost any foot corrective appliance of the character of a metatarsal pad to be located with great accuracy in a shoe.

From the foregoing, it is apparent that I have provided a gauge for locating the proper position for foot corrective appliances within a shoe, which gauge is simple in construction, economical to manufacture, and may be used with great facility and accuracy. The gauge is light in construction, includes adjustments for various locations of affliction, the same gauge may be used for both right and left feet, and the construction, though simple, is very durable.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. In a gauge of the character described, a rod, a heel engaging part pivoted to said rod, the pivotal connection being sufficiently tight to frictionally hold said rod and said part in relative positions of adjustment, and an element in simulation of a foot correction appliance adjustably carried by said rod.

2. In a gauge of the character described, a rod having a heel engaging part, a sleeve slidable on said rod, and an element in simulation of a foot correction appliance pivoted to said sleeve so as to be adjustable in a plane parallel to that of the rod.

3. In a gauge of the character described, a rod, a heel-engaging element pivoted to said rod, means slidably associated with said rod for movement towards and away from said element, and a substantially egg-shaped member in simulation of a corrective pad for the metatarsal arch of a foot pivotally carried by said means.

4. In a gauge of the character described, a rod, a heel-engaging element pivoted to said rod, means slidably associated with said rod for movement towards and away from said element, and a substantially egg-shaped member in simulation of a corrective pad for the metatarsal arch of a foot pivotally carried by said means, and means connecting the relative parts in such a manner as to be frictionally held in relative positions of adjustment against disarrangement during usage.

5. In a gauge of the character described, a body member, a heel-engaging part pivoted to said member, the pivotal connection being sufficiently tight to frictionally hold said member and said part in relative positions of adjustment, an element in simulation of a foot correction appliance adjustably carried by said body member, and marking means associated with said element to indicate the position of a foot corrective appliance in an article of footwear.

6. In a gauge of the character described, a body member, an indicating element shaped with one end smaller than the other slidably and pivotally connected with said body member, said element being slidable lengthwise of the body member and pivotal relatively to the body member to selectively position the small end of the element on either side of the axis of the body member to adapt the gauge for use with both right and left articles of footwear.

7. A gauge for transferring to a foot appliance a point located by first applying the gauge to the human foot, said gauge comprising an element adapted to engage the heel of a foot, a body member pivoted to said element by a connection providing for relative movement of said element and said body member to adjusted position in the application of the gauge to the foot with said connection being formed tight enough to hold said element and said body member in adjusted position when the gauge is disengaged from the foot to transfer the located point to a foot appliance, and an indicating element cooperable with said body member.

8. A gauge for transferring to a shoe a point located by first applying the gauge to the human foot, said gauge comprising a body member, an indicating member carried by said body member, a marking element carried by one of said members, means whereby said marking element is adapted to be swung to mark a line on the sole of a shoe, said means including an element pivotally connected to one end of said body member and shaped to define a heel engaging element when the gauge is applied to the human foot and to define a heel engaging stop member when the gauge is applied within a shoe.

WILLIAM M. SCHOLL.